United States Patent [19]
Hurst

[11] 3,884,344
[45] May 20, 1975

[54] ARTICLE CONVEYING SYSTEM
[75] Inventor: Robert L. Hurst, Muncie, Ind.
[73] Assignee: Ball Corporation, Muncie, Ind.
[22] Filed: Dec. 20, 1972
[21] Appl. No.: 316,951

Related U.S. Application Data
[62] Division of Ser. No. 99,405, Dec. 18, 1970, Pat. No. 3,712,453, which is a division of Ser. No. 784,845, Dec. 18, 1968, Pat. No. 3,641,959.

[52] U.S. Cl. .............................. 198/31 AA; 198/41
[51] Int. Cl. ............................................. B65g 47/26
[58] Field of Search........ 198/31 AA, 41; 271/63 A, 271/18 A, DIG. 3, 193; 214/1 BA, 1 BS

[56] References Cited
UNITED STATES PATENTS
| | | | |
|---|---|---|---|
| 1,892,590 | 12/1932 | Steele et al. ........................... | 198/41 |
| 2,848,098 | 8/1958 | Talbot................................... | 198/41 |
| 2,890,785 | 6/1959 | Nigerelli et al. ............... | 198/31 AA |

Primary Examiner—Evon C. Blunk
Assistant Examiner—Douglas D. Watts
Attorney, Agent, or Firm—James D. Haynes

[57] ABSTRACT

Completely automatic system for handling articles such as metal discs for closures of the two-piece type. Wherein lids are picked up at a first transfer zone sequentially by individual magnets on the lower pass of a second conveyor and moved to a second transfer zone where they are released in groups to form transverse rows on a wide third conveyor belt.

2 Claims, 9 Drawing Figures

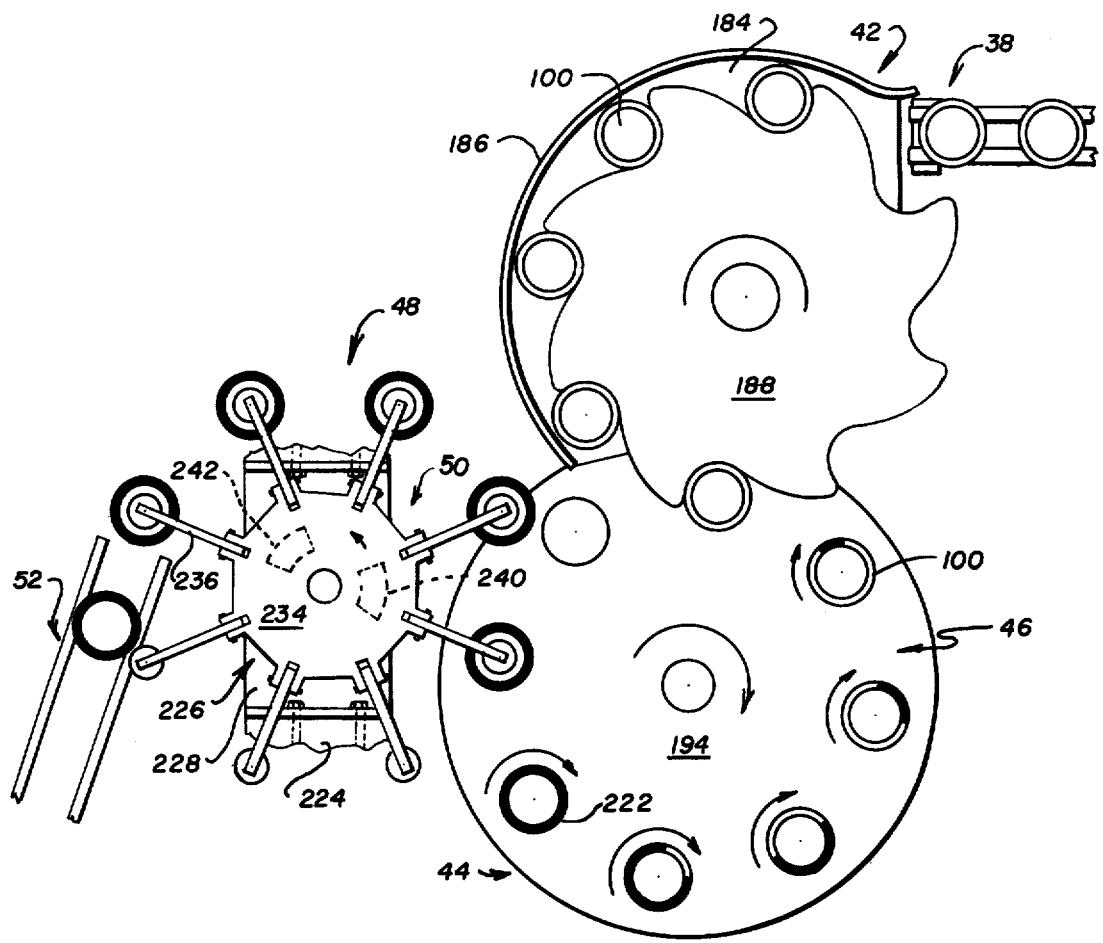
FIG. 2
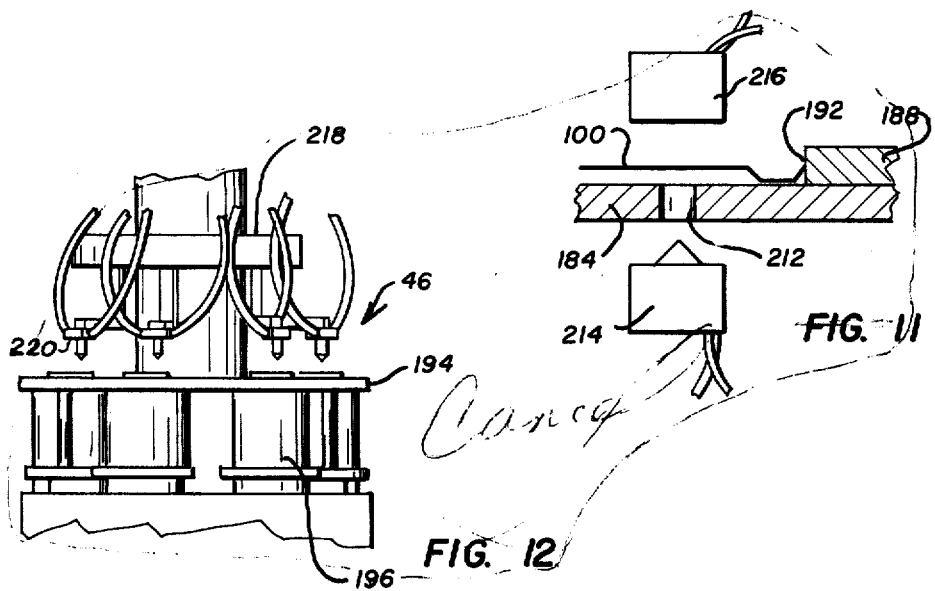
FIG. 11
FIG. 12

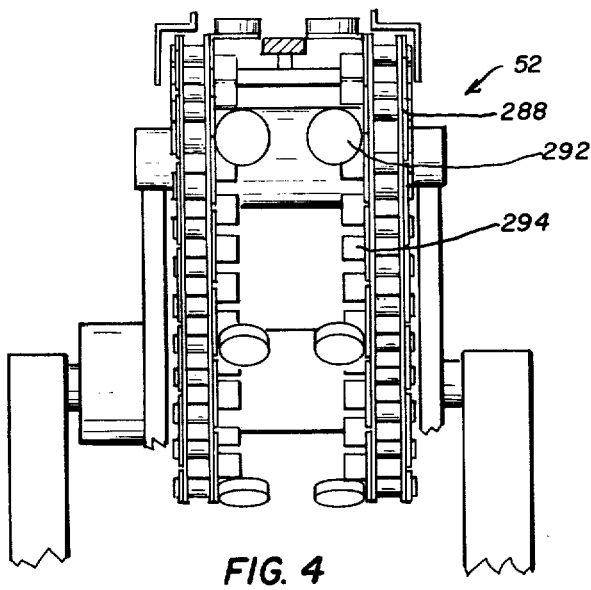
FIG. 4
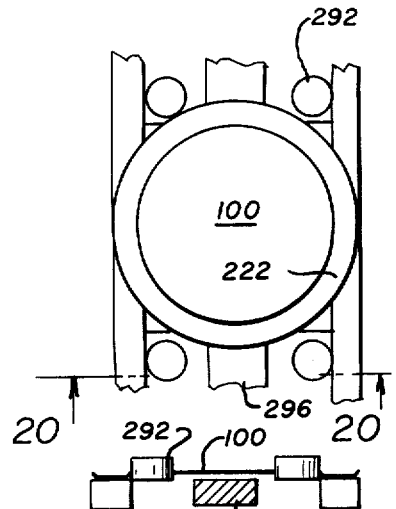
FIG. 5
FIG. 6
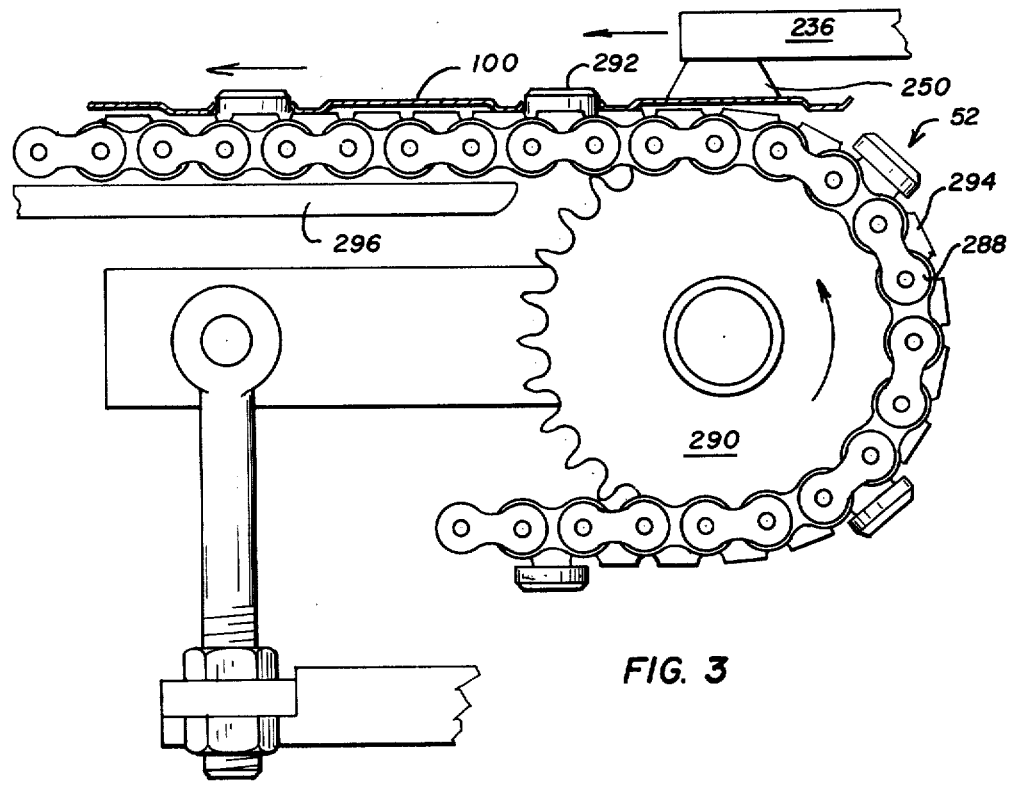
FIG. 3

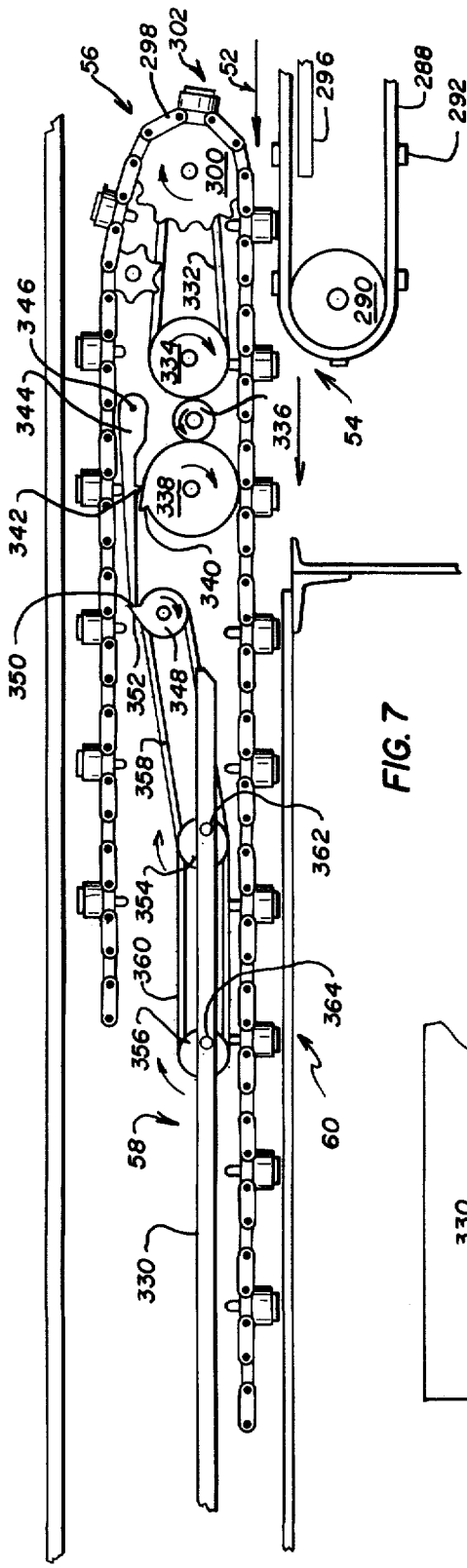
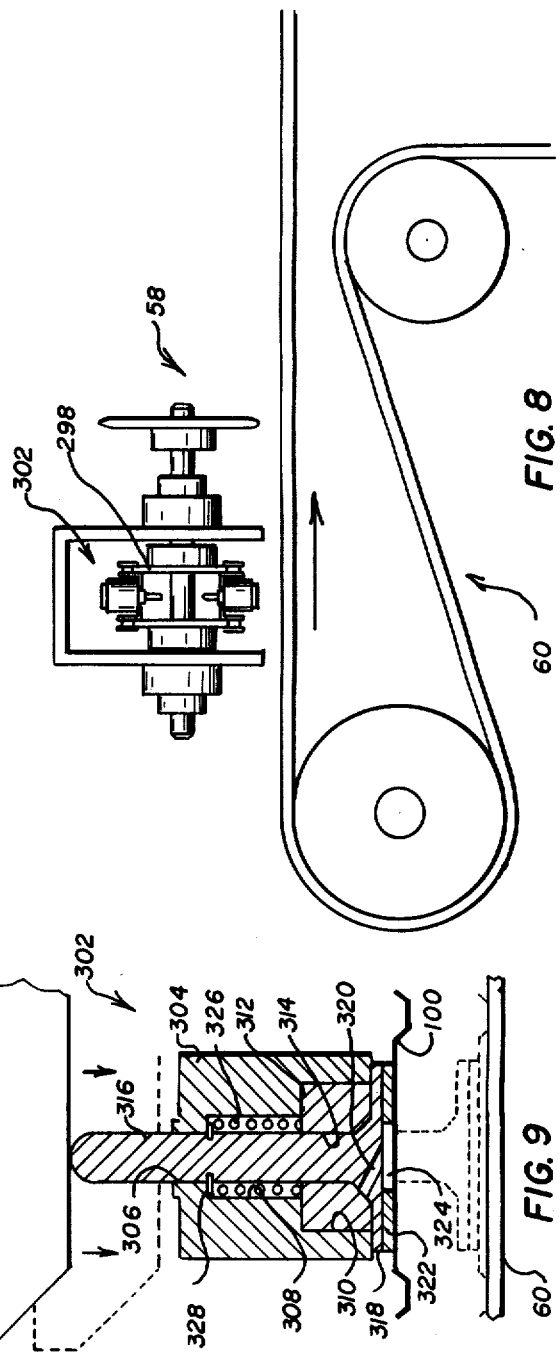
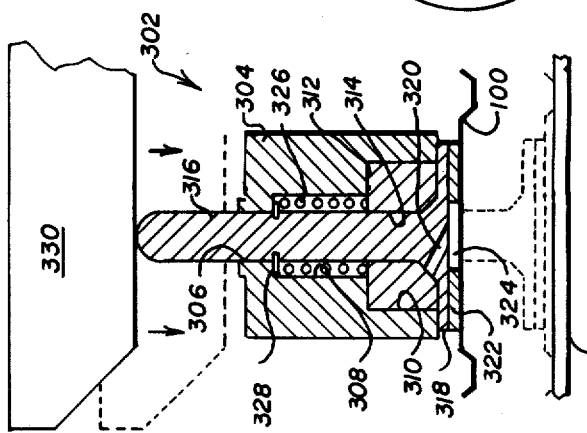
FIG. 7
FIG. 8
FIG. 9

ARTICLE CONVEYING SYSTEM

CROSS REFERENCE TO RELATED APPLICATION

This application is a Division of my copending application Ser. No. 99,405, filed Dec. 18, 1970 and entitled "Apparatus For Transferring Articles" (now U.S. Pat. No. 3,712,453) which application was a Division of my then copending application Ser. No. 784,845, filed Dec. 18, 1968 and entitled "Method and Apparatus For Producing Closures" (now U.S. Pat. No. 3,641,959, issued Feb. 15, 1972).

BACKGROUND OF THE INVENTION

Glass jars have been used for many years for the purpose of home canning of fruits and vegetables, and many types of closures have been evolved for sealing such jars. Of the many early types, Putman's "Lightning Jar", which utilized a glass cover plate, the margin of which pressed an annular rubber gasket against the margin of the jar mouth with the cover plate held tight by a toggle operated bail, and Mason's screw threaded jar fitted with a zinc cap having mating threads on the flange to hold rubber gasket material against the jar to form a top seal, were particularly popular.

Subsequently, two-piece closures were developed coomprising a disc type lid having a concave margin to seat on the margin of the jar mouth, the concave margin being coated with a gasket material formed in place such as cured latex and, more recently, plastisol, the lid being clamped in place by a flanged and threaded band which engaged corresponding threads on the jar mouth and the periphery of the lid. The two-piece closure has come into widespread use because the bands may be used repeatedly so that only the lids need be replaced for each new use.

Prior practice in the manufacture of the lids has been rather inefficient and relatively costly because of a large amount of manual handling, which also results in lower production than might otherwise be realized for effort expended. The lids are very thin and may be easily deformed. Moreover, they are commonly treated on the sealing face to prevent corrosion by the contents of a jar and it is essential to avoid scratching the protective coating which would render them unusable. It has been common after each operation to place, or stack, the lids in a storage bin. They then have to be sorted out and fed uniformly into the next operating stage. When gasket material to be formed in place is applied to the concave marginal seat, it is in viscous form but still quite subject to running or spreading if the lid is tilted or jarred laterally while it is traveling to a curing station. A large proportion of two-piece closures have been assembled by hand, and this, too, has proved to be cumbersome as well as expensive.

SUMMARY OF THE INVENTION

The present invention overcomes the difficulties mentioned above and provides a system for handling articles by careful transfer utilizing a plurality of conveyors. The articles are accurately controlled at every stage to prevent damage of any kind and, as a result, production rates have been increased substantially, while at the same time greatly enchancing uniformity and quality of product.

The overall system, of which this invention is a part, is disclosed in U.S. Pat. No. 3,641,959 of which this application is a divisional application. As the lids are processed a coating of sealing material, which may be latex, but preferably a selected plastisol, is applied to the margin of each lid in the concave seat.

A carousel is located adjacent to the coating table and includes a standard mounted for rotation about a vertical axis and a plurality of radial arms. Each arm has a pickup device, which may be magnetic or vacuum, at its outer end to pick up a lid from a station of the coating table. The carousel is so located and operated at such a rate that the pickup devices pass over a selected point on the peripheral path of travel of the coating stations at the same time as one of the coating stations reaches that point, and each pickup device picks up one lid and swings it through an arc to deposit it on the upper pass of the adjacent end of the first belt type conveyor.

This conveyor which along with the second and third conveyors and components associated therewith are featured in this invention as claimed herein, moves the lids sequentially to the next transfer zone where a second conveyor is arranged in longituidinal alignment with the first and its receiving end overlaps and overlies the delivery end of the first so that its lower pass is spaced vertically above the upper pass of the first. This lower pass travels in the same direction as the upper pass of the first and is provided with discrete individual magnets, each of which picks up a single lid from the first conveyor and carries it onward to the next transfer zone.

At this latter transfer zone a third conveyor belt is arranged with its horizontal path of travel perpendicular to that of the second conveyor, and it extends from this transfer zone to and through a second treating zone or curing station. The third belt is wide enough to accomodate a plurality of lids in a row transverse to the direction of of travel of the belt, and the row may consitute as many as twenty lids. As the second conveyor delivers lids to the transfer zone, its magnets are caused to release a plurality of lids simultaneously to deposit them in transverse rows on the third belt for travel to and through the curing station.

When the lids with their sealing material cured leave the curing station, they move to the next transfer zone where a diverter intercepts each row and realigns it into a single file stream which travels onward to an assembly zone.

BRIEF DESCRIPTION OF THE DRAWINGS

Various other advantages and features of novelty will become apparent as the description proceeds in conjunction with the accompanying drawings, in which:

FIG. 2 is a plan view of the infeed disc, the coating table, and the carousel for removing lids from the coating table;

FIG. 3 is a side elevational view of a portion of the conveyor shown in FIG. 2;

FIG. 4 is an end view of the conveyor shown in FIG. 3;

FIG. 5 is a top plan view of a portion of the conveyor shown in FIG. 3;

FIG. 6 is a schematic sectional view on line 20-20 of FIG. 5;

FIG. 7 is a side elevational view of portions of two conveyors at a transfer zone;

FIG. 8 is an elevational view of portions of two conveyors at another transfer zone;

FIG. 9 is an elevational view, partly in section, of an independent magnet and release means.

DESCRIPTION OF PREFERRED EMBODIMENTS

Figure 1:
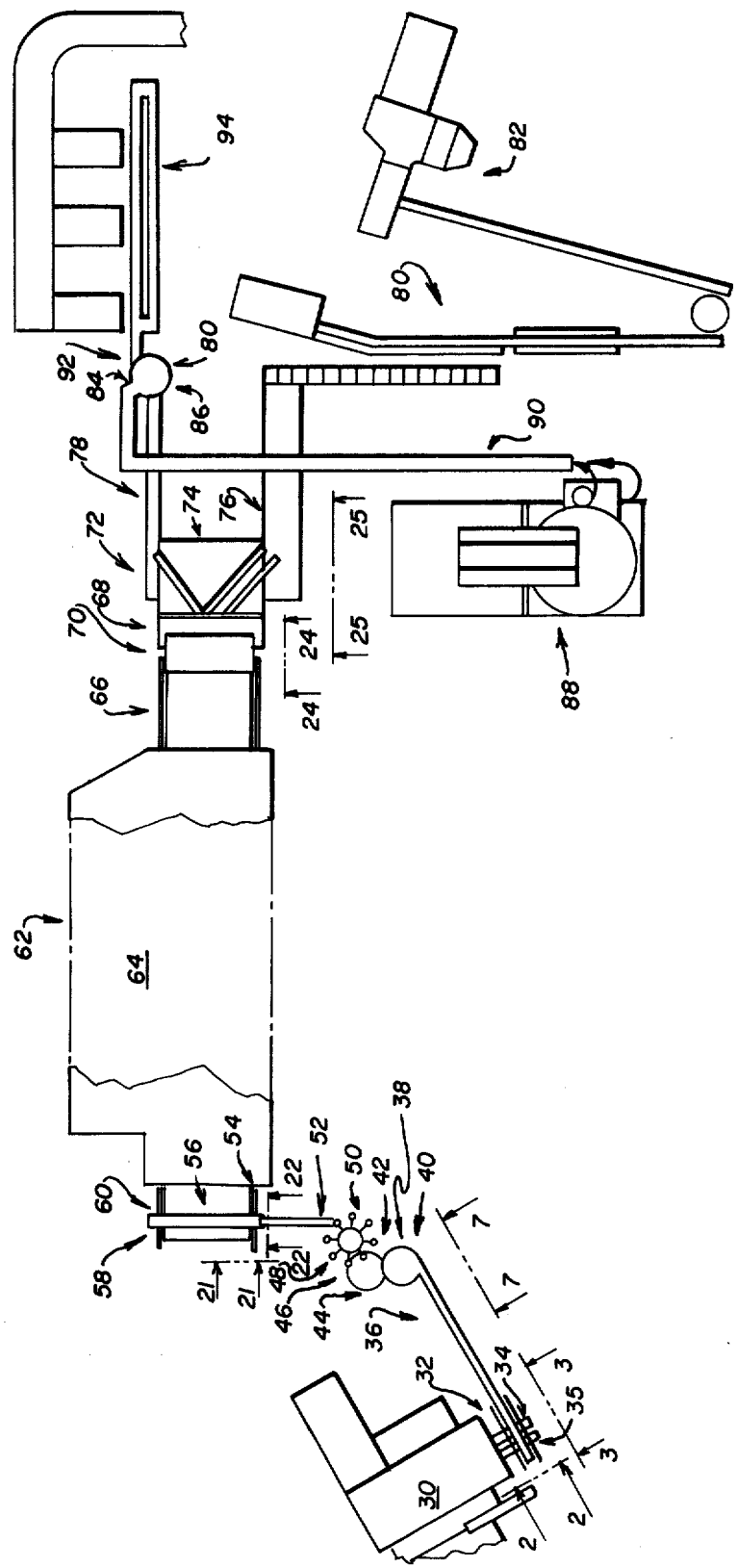
FIG. 1 is a schematic view, in plan form, showing the various parts of an apparatus constructed in accordance with the invention.

The total apparatus for the practice of the invention is schematically illustrated in FIG. 1, where a stamping and forming machine 30 operates continuously to stamp discs from sheet stock and form them into closure lids by producing a concave sealing margin around the entire periphery of the lid, which margin is coated with a thin layer of sealing material, which may be latex or a plastisol, the latter being presently preferred. The plastisol is subsequently cured in an oven to a rubber-like consistency and is adapted to make sealing contact with the mouth of a typical Mason-type jar in use.

The machine 30 sequentially supplies lids with their first, or sealing, face down to a first conveyor 32. The conveyor then sequentially delivers the lids to a first transfer zone 34, where inverter means 35 inverts the lids and moves them onward. The inverter means includes the delivery end of a second conveyor 36. By the use of magnetic means to be later described, the lids are sequentially transferred to the second conveyor with their second faces in contact with the conveyor belt, and are held in contact with the belt while it passes around an end loop pulley, with the result that the lids now travel along the upper pass of the second conveyor with their first faces up.

The second conveyor now delivers the lids sequentially to a second transfer zone 38 where an automatically controlled stop means 40 allows them to pass individually to a second transfer means 42 including a star wheel which feeds the lids sequentially into a first treating zone 44 and onto a coating machine 46. The latter applies the plastisol coating to the concave marginal seat of each lid as they move through the treating zone to the third transfer zone 48. A third transfer means in the form of a carousel 50 picks up each lid and moves it to the adjacent receiving end of a third conveyor 52.

Conveyor 52 moves the lids sequentially to a fourth transfer zone 54, where a fourth conveyor 56 picks them up from the third conveyor and delivers them to a fifth transfer zone 58 and deposits them on a fifth conveyor 60. The latter is provided with a belt much wider than those of the previous conveyors and it is arranged to travel in a direction perpendicular to the path of travel of the fourth conveyor. The delivery end of conveyor 56 overlies the entire width of the receiving end of conveyor 60 and is arranged to simultaneously deposit a plurality of lids on conveyor 60 in a row transverse to the path of travel of conveyor 60. This operation is repeated successively so that conveyor 60 continuously receives such transverse rows.

Conveyor 60 moves the rows of lids onward to a second treating zone 62 where they pass through a curing station 64 and on to a sixth transfer zone 66, where they are transferred to a sixth conveyor 68 with the aid of a seventh conveyor 70 overlying the adjacent ends of conveyors 60 and 68. Conveyor 68 moves the rows of lids onward to a seventh transfer zone 72, and at this zone a diverter 74 intercepts the rows and realigns them to travel diagonally in single file onto the receiving end of an eighth conveyor 76. Alternatively, the diverter 74 may be arranged to divide the rows and send a portion of each to a ninth conveyor 78.

Those lids which are deposited on conveyor 76 travel onward to an assembly zone 80 where they are arranged in sets, such as a dozen or a half dozen, and placed in boxes. The boxes then move on to a packaging station 82 where they are packed in larger cartons ready for shipping.

Those lids which are deposited on conveyor 78 travel onward to a second assembly zone 84 where they are fed sequentially into an assembly machine 86. Flanged closure bands from a source of supply 88 are deposited on a tenth conveyor 90 which delivers them to assembly zone 84 and feeds them sequentially into assembly machine 86. The machine aligns sets of one lid and one band in registry, seats each lid in its band and deposits them on eleventh conveyor 92 which delivers them to second packaging zone 94 to be packed and shipped.

Referring to FIG. 2, the star wheel 188 coordinated with table 194 so that it deposits lids one at a time to the coating stations disposed slightly below the surface of plate 184 to facilitate transfer. Each lid is secured against the upper surface of its respective station by suitable means, not shown, such as a magnet or a source of reduced pressure. Each coating station is mounted in an opening in table 194 for rotation about its own axis and means are provided for causing such rotation at a rate which will cause a full revolution while the table is passing through a partial rotation.

Since the lids 100 are secured to the stations, they will each make a full revolution about their own vertical axis during the time their respective nozzles are in operation. As a result, each will receive a full annular coating 222 of sealing material in their concave seats which is later to serve as a gasket. Following the application of the sealing material, continued rotation of the coating table sequentially brings each lid to a point adjacent to the third transfer zone, and the means for securing them against the coating stations are released.

Referring now to FIGS. 1 and 2 transfere means 50 comprises a support 224 and a carousel 226 mounted on the support for rotation about a vertical axis. A base plate 228 is fixedly attached to support 224. The carousel includes a rotor plate 234 to which a series of radially extending pickup arms 236 are attached.

Mounted on base plate 228 are cams 240 and 242, each adapted to be engaged by a cam follower on each arm 236 once in each revolution to cause raising of the inner end and lowering of the outer end of each arm. The arms are normally held in a position with their outer ends raised engaging means located on the ends of arms 236 transfer lids 100 from table 194 to conveyor 52.

Bearing in mind the fact that, although the plastisol used as the sealing material is considered as a viscous material, it can flow on the upper surface of the lid if the latter is subjected to any sudden movements or vibrations. Thus, it is necessary to reduce disturbance to a minimum until the lids reach the curing station. For this reason the apparatus described above is arranged and coordinates so that, at the pickup point in FIG. 2, the circular paths of travel of the pickup devices and the coating stations are "tangent," and the pickup devices and stations are traveling in the same direction at the same speed. Also at the point of deposit on conveyor 52, the pickup device is traveling at the same speed and in the same direction as the conveyor belt. Thus there are no abrupt changes of direction or speed to distrub the flowable sealing material.

Referring to FIGS. 1, and 3 through 6 conveyor 52 comprises a belt 288 of the chain type to facilitate timing with the carousel and the succeeding conveyor. However, it it to be understood that a fabric type belt can be used in this and all other locations with appropriate sprocket drive where accurate timing is desired, and the term "endles loop belt" refers to any type belt suitable for use in the apparatus. The belt actually comprises two laterally spaced chains as shown in FIG. 4 each carried on a sprocket 290 at each end of the conveyor and driven by a motor not shown. Detents 292 are evenly spaced along each chain and define between them spaced areas or seats to receive individual lids. A series of tabs 294 are secured to both chains between the detents to provide primary support for the lids.

An elongate bar magnet 296 is arranged to closely underlie the belt and extends from the end shown in FIG. 3 to a point somewhat short of the delivery end of the conveyor. When the pickup device 250 releases a lid it is pulled down into seating engagement on the tabs 294. In the case of the magnetic pickup device 282, the magnet 296 is considerably stronger and pulls the lid away from thepickup device. During their course of travel on the conveyor, the lids are held securely on the belt by the field of magnet 296 and therefore they are subject to minimum disturbance.

Referring now to FIGS. 1, 4, 7, and 8 the construction and operation of the conveyor 56, together with associated elements will now be described. Conveyor 56 essentially comprises belt 298 in the form of chains trained over sprockets 300 at both ends of the conveyor, the sprockets 300 being driven by sprockets 290, and magnetic pickup devices 302 secured to the belt 298 at exactly the same spacing as the lid seats on belt 288.

As will be observed at the right hand end of FIG. 7, the receiving end of the fourth conveyor 56 overlies the delivery end of the third conveyor 52 in slightly spaced relation and overlaps it by an amount slightly greater than the extent of one lid seat on belt 288. Belts 288 and 298 are coordinated so that they travel at the same lineal speed and each successive pickup device 302 travels directly over the center of the cooperating lid seat on belt 288. Thus at the transfer point each device 302 picks up the underlying lid and carries it onward, to the left in FIG. 7, to bring it over the appropriate part of conveyor belt 60 in transfer zone 58. Belt 60 is considerably wider than the previous belts, being capable of receiving a row of as many as 18 or 20 lids, extending transversely of its length and direction of travel. As shown in FIGS. 7 and 8 belt 60 travels in a direction perpendicular to the direction of travel of belt 298. Means to be described later cause the magnetic pickup devices 302 to release a plurality of lids simultaneously on the receiving end of belt 60 to form the transverse rows mentioned. The release means acts intermittently so that a continuous series of transverse rows of lids are deposited on belt 60 at longitudinal intervals.

The releasable magnetic pickup devices 302 are illustrated in detail in FIG. 9. Each device comprises a cylindrical body 304 having a bore 306 for the passage of a shaft, a first counter bore 308 for the reception of a spring, and a second, larger counterbore 310 to receive a magnet. Each body is mounted on belt 298 so that the magnet end faces outwardly of the belt. Magnet 312 is press fitted into counterbore 310 and is provided with a central bore 314. A plunger 316 is slidably mounted in bores 306 and 314 and provided with a head 318 which overlies the outer end of the magnet, the head being provided with a relief opening 320 to prevent a vacuum drag which might interfere with release of a lid. The outer face of the head 318 is coated with a layer 322 of a material having a low coefficient of friction and being unaffected by a magnetic field, such as a suitable plastic, the head having a large vaccum breaking opening 324.

Magnet 312 confines a compression spring 326 in counterbore 308, and a snap ring 328 on plunger 316 engages the upper end of the spring to yieldingly hold the plunger in retracted postion. When the plunger is fully retracted, the field of magnet 312 is strong enough to extend outwardly beyond the plunger head and layer 322 and pick up a lid from belt 288 and retain it for delivery to transfer zone 58. When a pickup device reaches the appropriate location in the transfer zone, a release member 330 presses plunger 316 downwardly and outwardly, and head 318 moves correspondingly to lower lid 100 to such an extent that the lifting force of magnet 312 is negatived and the lid is released to conveyor 60.

The release mechanism to operate 330, which is an elongate bar, includes a chain 332 driven by a sprocket, not shown, which is mounted on the same shaft as sprocket 300. The chain drives gear 334, which engages idler gear 336 to drive gear 338 in a clockwise direction as viewed in FIG. 7. Gear 338 carries a cam 340, which engages cam follower 342 of lever arm 344 once in each revolution of gear 338 to raise the arm clockwise about its pivotal mounting 346.

Release rotor 348 is connected by means of a slip clutch, not shown, to a power source such as the drive shaft of sprocket 300 to be rotated clockwise when not blocked. The end 350 of lever arm 344 serves as a stop to engage detent 352 on rotor 348. When cam 340 of gear 338 engages cam follower 342, arm 344 rises sufficiently to disengage its stop 350 from detent 352 and allow rotor 348 to rotate. However, as soon as cam 340 passes cam follower 342, the arm 344 again lowers, and its stop 350 rides on the surface of rotor 348 to intercept detent 352, limiting the rotor to one full turn for each full turn of gear 338. The rotor operates more rapidly than gear 338 in order to perform its release function during minimum travel of belt 298.

Release rotor 348 drives support rotors 354 and 356 in a positive manner through chains 358 and 360 and sprockets not shown so that the support rotors will make one full revolution each time the release rotor makes one full revolution. Release bar 330 is arranged horizontally closely spaced above the lower pass of belt 298 and a plurality of magnetic pickup devices 302. The bar is eccentrically mounted to rotors 354 and 356 by pivot pins 362 and 364 which are directly to the right of the rotor centers when the rotors are at rest. Hence, each time rotor 348 is released, rotors 354 and 356 immediately move bar 330 down to contact a plurality of plungers 316 and release a corresponding number of lids. This is accomplished in the first 90° of movement of the rotors and during the remainder of their rotation the bar is raised and returned to its original position, ready for the next cycle. Thus it will be seen that the release mechanism operates intermittently to deposit transverse rows of lids on conveyor 60 while conveyor 56 runs continuously. The length of bar 330 is selected to release the desired number of lids in each cycle.

Conveyor 60 is operated at a selected speed to produce the desired longitudinal gap between the transverse rows of lids and this is normally much slower than the lineal speed of conveyor 56. Referring to FIG. 1, conveyor 60 carries the rows of lids to and through the second treating zone 62 and its curing station 64, where they are subjected to predetermined elevated temperatures for a sufficient period of time to allow the sealing material 222 to cure and set up. Since the apparatus shown in FIG. 1 may utilize any one of a number of conventially available curing chambers or ovens, further discussion of the contruction and operation of such equipment is not deemed necessary.

It will be apparent to those skilled in the art that various changes may be made in the construction and operation of the system disclosed without departing from the spirit of the invention, and it is intended that all such changes shall be embraced within the scope of the following claims.

What is claimed is:

1. Apparatus for moving articles from a predetermined location comprising: a first conveyor extending from said location to a first transfer zone and being provided with an endless loop type belt, the upper pass of which is adapted to carry articles and deliver them to the first transfer zone; a second conveyor extending from the first transfer zone to a second transfer zone and being provided with an endless loop type belt, the lower pass of which is adapted to receive articles at the first transfer zone and deliver them to the second transfer zone; and magnetic pick up means associated with the second conveyor to sequentially raise the articles delivered to the first transfer zone into contact with the belt of the second conveyor and retain them in contact therewith during delivery to the second transfer zone, said magnetic pick up means comprising a body attached to the conveyor belt; a magnet carried by said body and having an outer face; a plunger carried by said body and having an inner free end and an outer end; and a spacer head at the outer end of the plunger normally closely overlying the outer face of the manget and movable away from said face on occasion to push an article out of the field of the magnet to release the article.

2. Apparatus as claimed in claim 1; and movable means on said second conveyor actuatable at predetermined intervals to move into engagement with the free ends of a plurality of said plungers simultaneously to cause the release of a plurality of articles.

* * * * *